Feb. 25, 1941.     B. L. QUARNSTROM     2,233,224
NUT
Filed Oct. 21, 1939     2 Sheets-Sheet 1
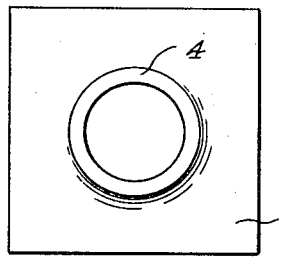
Fig. 1.
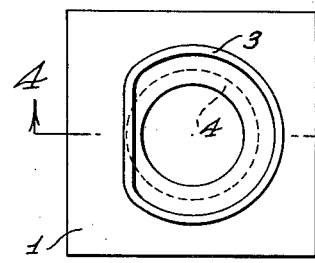
Fig. 2.
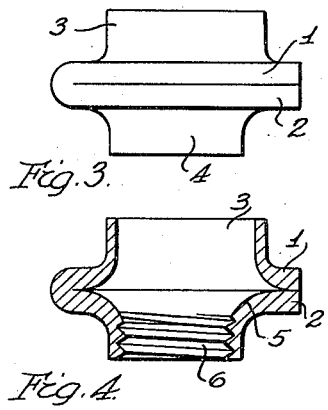
Fig. 3.
Fig. 4.
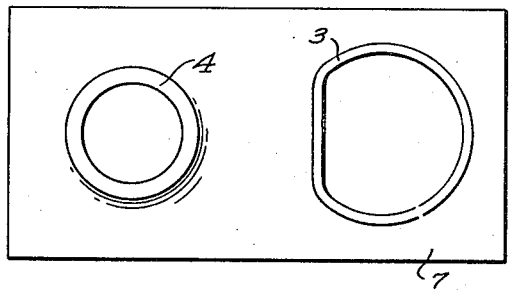
Fig. 5.
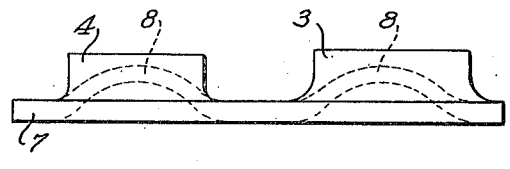
Fig. 6.
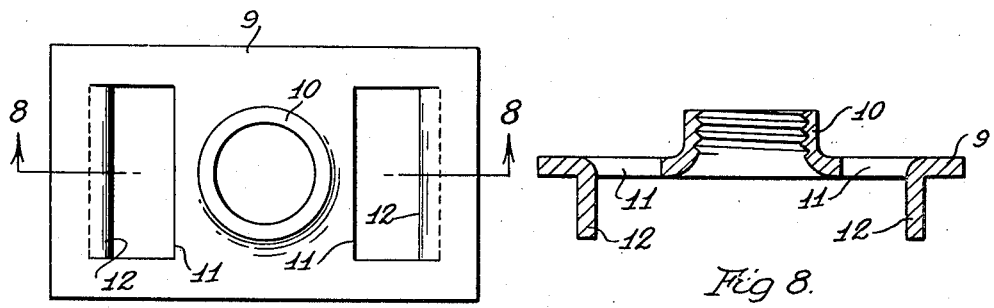
Fig. 7.
Fig. 8.
INVENTOR.
Bert L. Quarnstrom
BY
ATTORNEY.

Feb. 25, 1941.  B. L. QUARNSTROM  2,233,224
NUT
Filed Oct. 21, 1939  2 Sheets-Sheet 2

INVENTOR.
Bert L. Quarnstrom
BY
ATTORNEY.

Patented Feb. 25, 1941

2,233,224

UNITED STATES PATENT OFFICE 2,233,224

NUT

Bert L. Quarnstrom, Grosse Pointe, Mich.

Application October 21, 1939, Serial No. 300,502

6 Claims. (Cl. 10—72)

This invention relates to nuts and to the method of making the same, and has for its primary object to provide a nut which includes means integral therewith for retaining itself on one of a plurality of members to be secured together, for the purpose of obviating the necessity of manually holding the nut against displacement or rotation when a screw or bolt is inserted thereinto.

More specifically, the main object is to provide a nut composed entirely of sheet metal and including an upstanding portion or portions adapted to be inserted into an aperture in a supporting member and thereafter clinched over the walls of the aperture to prevent displacement of the nut from the member. The upstanding portions and the apertures in which they are to be inserted are of similar shape and of other than round shape so that engagement of the walls of the upstanding portions with the walls of the apertures prevents rotation of the nuts. For example, the upstanding portions and the apertures might be D shaped, rectangular, polygonal or any other suitable shape.

Another object is to provide a sheet metal nut having a portion thereof extruded from the normal plane thereof, of tubular form and internally threaded to receive a screw or bolt, said nut also having means formed integral therewith which functions to retain the nut on one of a plurality of members to be secured together, in position for reception of a screw or bolt. In conjunction with this object, a more specific object is to teach alternative forms of retaining means. In its preferred form, the retaining means comprises an integral, upstanding, hollow formation of other than round shape, formed by extruding a portion of the sheet metal from its normal plane. As an alternative, the clinching means is provided by piercing the sheet metal to form prongs which are bent into an upstanding position, from which they are subsequently deformed during the clinching operation. In conjunction with the prong type clinching means the invention, in some cases, provides additional folded portions which function to reinforce the nut and also to cover and seal the openings which unavoidably result from formation of the prongs. In another alternative form, the sheet metal is bent into U-shape, and the two arms of the U are adapted to frictionally engage a supporting member interposed therebetween to support the nut thereon.

Another object is to provide a nut composed of two folds of sheet metal, one of the folds having an upstanding internally threaded portion, and the other fold having a clinch-over portion upstanding with respect to its outer surface, in opposed relation to and in alignment with the internally threaded portion.

Another object is to provide a method of manufacturing a nut such as referred to above, economically, and without waste stock. In this respect a flat, rectangular, sheet metal blank is provided, and at two spaced points the blank is deformed by pressing such portions into concavo-convex formations. The concavo-convex portions are then pierced and formed into extensions of tubular form, one of which is round, and the other of which is other than round. The blank is then bent upon itself to dispose the two tubular extensions in opposed relation and in alignment. The tubular extension which is of round shape is internally threaded, preferably after the steps above described have been performed, but it may, if desired, be tapped prior to bending the blank upon itself.

Another and more specific object is to provide a nut wherein the threaded tubular portion is so formed as to avoid damage to the screwthreads by the clinching punch which subsequently operates to clinch the nut on the supporting member.

Other objects and advantages will become more fully apparent as reference is had to the accompanying drawings wherein my invention is illustrated, and in which:

Figs. 1 and 2 are opposite plan view of the nut,

Fig. 3 is a side elevation,

Fig. 4 is a section taken on the line 4—4 of Fig. 2,

Fig. 5 is a plan of the blank prior to the folding operation,

Fig. 6 is an elevation of the same blank,

Fig. 7 is a plan of a nut having alternative clinching means,

Fig. 8 is a section taken on the line 8—8 of Fig. 7,

Figure 9:
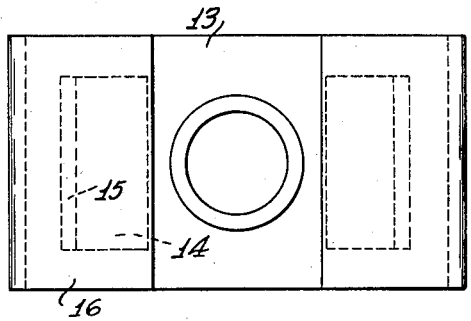
Figure 10:
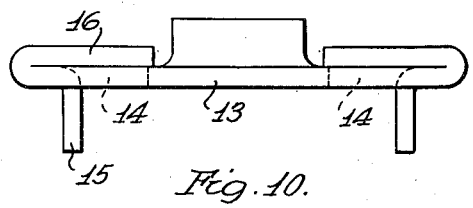
Figure 11:
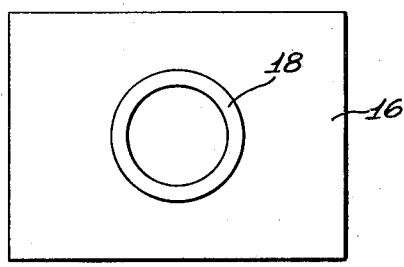
Figure 12:
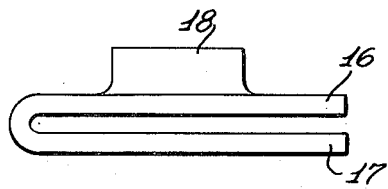
Figure 13:
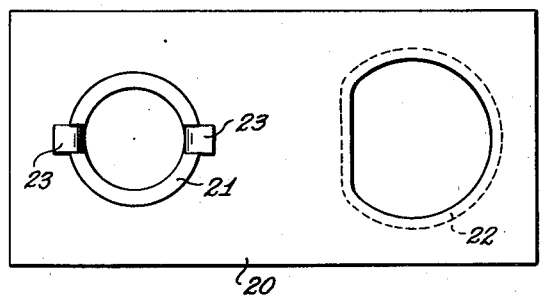
Figure 15:
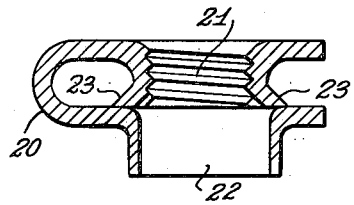
Figure 16:
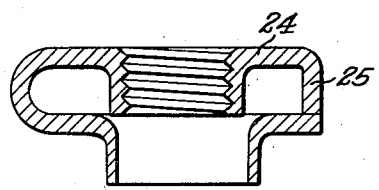
Figure 14:
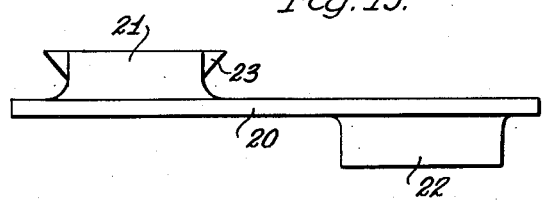

Figs. 9 and 10 are a plan and side elevational views, illustrating the nuts of Figs. 7 and 8 with reinforcing and sealing means, Fig. 11 is a plan illustrating a nut with another alternative retaining means, Fig. 12 is a side elevation, corresponding to Fig. 11, Fig. 13 is a plan and Fig. 14 an elevation illustrating a modified blank, Fig. 15 is a cross section of a nut formed from the blank shown in Figs. 13 and 14, and Fig. 16 is a cross section of a nut similar to the nut shown in Fig. 14, illustrating the addition of a spacer element thereto.

As illustrated in Figs. 1 to 4, the nut comprises two sheet metal folds or laminations 1 and 2. The fold 1 has an upstanding clinching portion 3 extruded or forced therefrom in such manner as to form an opening in the lamination through which a bolt may extend. The clinching portion 3 is illustrated as being of D-shape in plan, but it will be understood, of course, that this shape is shown by way of example only and that the clinching portion might be made rectangular or polygonal. Regardless of the shape of the clinching portion it is always formed with its smallest dimension greater than the diameter of the bolt the nut is to receive.

The lamination 2 has an integral tubular portion 4 connected thereto by a rounded or fillet-like portion 5, and internally threaded at 6. The tubular portion 4 is in alignment with the clinching portion 3 and when the clinching portion is inserted in an aperture in a supporting member and clinched by a clinching punch the fillet-like portion 5 prevents injury to the threads by contact of the clinching element therewith.

The method by which the above described nut is formed consists in first providing a flat sheet metal blank of rectangular form, designated 7 in Figs. 5 and 6. The next step is deforming the blank by pressing portions outwardly in like directions from the normal plane thereof at two separated points. The blank is thus provided with two concavo-convex formations 8, illustrated in broken lines in Fig. 6. The concavo-convex formations are next pierced and shaped to provide the clinching portion 3 and the tubular portion 4. The blank is then bent or folded upon itself in such manner that the clinching portion 3 and the tubular portion 4 are brought into opposed coaxial relation. The tapping operation by which the tubular portion 4 is provided with internal threads may be performed before the blank is folded or after the blank is folded, whichever is most convenient.

Figs. 7 and 8 illustrate a nut composed of a sheet metal body 9 having an internally threaded tubular portion 10 formed by the same method as the above described tubular portion 4. The body 1 is pierced at 11 and has prong-like portions 12 bent perpendicular to the normal plane of the body 9. When the nut is placed in service the prong-like portions 12 are inserted into an aperture in a supporting member and are clinched over the walls of the aperture.

The nut shown in Figs. 7 and 8 has openings formed therein as a result of the formation of the prong-like formations 12, and in certain types of installations these openings are objectionable inasmuch as they permit passage of dust etc. Figs. 9 and 10 illustrate a nut 13, generally similar to the nut shown in Figs. 7 and 8, having openings 14 therein as a result of the formation of the clinching members 15. This nut, however, is provided with additional fold-over portions 16 which overlie and seal the openings 14. The portions 16 also reinforce and add to the strength of the nut.

In the nut shown in Figs. 11 and 12 the clinching means is eliminated and the construction is such that the nut frictionally retains itself on a supporting member. This nut is formed of a sheet metal blank bent into U-shape, with the two wings 16 and 17 adapted to frictionally engage opposite sides of a supporting member interposed therebetween. The wing 16 has an internally threaded tubular portion 18 formed by the same method as the tubular portion 4.

As illustrated in Figs. 13, 14 and 15, it is not essential that the clinching and internal portions be in opposed relation, but might project in like directions from their respective folds. In such a case, the blank 20 has a tubular extension 21 struck therefrom in one direction, and a D-shaped extension 22. The blank is then bent into U-form as shown in Fig. 15, with the threaded extension 21 disposed between the two arms of the U. In order to prevent collapse of the two arms of the U, the threaded extension is formed with outwardly extended prongs 23 which contact the other portion of the U. As an alternative for the prongs 23, Fig. 16 shows a U-shaped nut 24, similar to that shown in Fig. 15, but having one arm of the U formed with an extension 25 which engages the other arm of the U and acts as a rigid separator or spacer for preventing collapse of the U.

Although specific embodiments of the invention have been illustrated and described, it will be understood that various other changes may be made within the scope of the appended claims without departing from the spirit of the invention, and such changes are contemplated.

What is claimed is:

1. The method of forming a nut which consists in providing a sheet metal blank, in deforming spaced apart portions of said blank outwardly of the main plane thereof and in like directions, in forming one of said portions into tubular shape for subsequent internal threading, in forming the other portion into a tubular form of other than round shape, and in folding the blank upon itself in such manner that the two tubular portions are disposed in opposed and aligned relation.

2. The method of forming a nut which consists in providing a sheet metal blank, in deforming spaced apart portions of said blank outwardly of the main plane thereof and in like directions, in forming one of said portions into tubular shape for subsequent internal threading and a flared or fillet-like portion connecting the tubular part to the blank, in forming the other portion into a tubular form of other than round shape, and in folding the blank upon itself in such manner that the two tubular portions are disposed in opposed and aligned relation.

3. The method of forming a nut which consists in providing a sheet metal blank, in deforming spaced apart portions of said blank outwardly of the main plane thereof, in forming one of said portions into tubular shape such that it is adapted to engage the threads of a screw, in forming the other portion into a form such that it is adapted to be clinched in an aperture, and in folding the blank upon itself along a line spaced equally from the two deformed portions in such manner that the two deformed portions are disposed in opposed end to end alignment.

4. A nut composed of a sheet metal blank having spaced apart portions deformed from the main plane thereof in like directions, one of said deformed portions being formed to engage the thread of a screw, the other portion being formed into other than round cross-sectional shape for subsequent clinching in an aperture, and said blank being folded upon itself in such manner that said two deformed portions are disposed in end to end and opposed aligned relation.

5. A nut composed of a sheet metal blank having spaced apart portions deformed from the main plane thereof in like directions, one of said deformed portions being formed into tubular shape and internally threaded, the other portion being formed into tubular form of other than round cross-sectional shape, and said blank being folded upon itself in such manner that said two tubular portions are disposed in opposed and aligned relation.

6. A nut composed of a sheet metal blank having spaced apart portions deformed from the main plane thereof in like directions, one of said deformed portions being formed into tubular shape and internally threaded and with a flared or fillet-like portion connecting the tubular part to the blank, the other portion being formed into tubular form of other than round cross-sectional shape, and said blank being folded upon itself in such manner that said two tubular portions are disposed in opposed and aligned relation.

BERT L. QUARNSTROM.